United States Patent [19]
Chasan

[11] Patent Number: 5,769,291
[45] Date of Patent: Jun. 23, 1998

[54] SUPPORT PAD ASSEMBLY FOR CARRYING ARTICLES ON VEHICLE ROOF

[76] Inventor: Paul E. Chasan, P.O. Box 675864, Rancho Santa Fe, Calif. 92067

[21] Appl. No.: 735,250

[22] Filed: Oct. 22, 1996

[51] Int. Cl.⁶ .................................................. B60R 9/048
[52] U.S. Cl. .......................... 224/324; 224/318; 224/319; 224/917.5; 224/562; 224/901.2; 224/901.4
[58] Field of Search ..................................... 224/324, 318, 224/319, 309, 917.5, 562, 901.2, 901.4

[56] References Cited

U.S. PATENT DOCUMENTS

| | | | |
|---|---|---|---|
| 3,273,768 | 9/1966 | Duer | 224/42.1 |
| 4,326,655 | 4/1982 | Gradek et al. | 224/324 |
| 5,067,644 | 11/1991 | Coleman | 224/324 |
| 5,312,030 | 5/1994 | Baravalle | 224/324 |
| 5,377,888 | 1/1995 | Baravalle | 224/309 |
| 5,377,889 | 1/1995 | Sumino et al. | 224/315 |
| 5,415,333 | 5/1995 | Wills | 224/328 |
| 5,460,310 | 10/1995 | Fabbri Corsarini | 224/315 |
| 5,607,093 | 3/1997 | Geier | 224/324 |

FOREIGN PATENT DOCUMENTS

| | | | |
|---|---|---|---|
| 1028651 | 5/1953 | France | 224/324 |
| 2482538 | 11/1981 | France | 224/324 |

*Primary Examiner*—Linda J. Sholl
*Attorney, Agent, or Firm*—Brown, Martin, Haller & McClain, LLP

[57] ABSTRACT

First and second elongate members each have an upper pad member of cushioning material, a first side bolster hinged to one side edge of the upper member and a second side bolster hinged to the opposite side edge of the upper member. Each side bolster has a core of cushioning material and extends along the entire length of the elongate member. The side bolsters are of rectangular cross-section and have opposing inner faces carrying interengageable fasteners for releasably securing the side bolsters together beneath the upper pad member. The two elongate members are secured on spaced crossbars of a vehicle roof rack by placing the upper pad member on top of a roof rack crossbar and engaging the side bolsters beneath the crossbar. At least one tie down strap is secured to one end of each elongate member for securing an elongate item on top of the upper pad member.

18 Claims, 2 Drawing Sheets

5,769,291

SUPPORT PAD ASSEMBLY FOR CARRYING ARTICLES ON VEHICLE ROOF

BACKGROUND OF THE INVENTION

The present invention relates generally to carrier devices for supporting articles on a vehicle roof, and is particularly concerned with a support pad assembly for attaching to an existing roof rack or directly to the vehicle roof and which is designed particularly for supporting elongate items such as surfboards, windsurfer boards, or skis.

Existing car roof racks are not particularly suitable for carrying windsurfer boards, surfboards, skis, or other elongate items. The items must be secured to the roof rack with straps, cords or the like which must be tied down on each side. This is a complicated procedure. When driving the vehicle at speed, a surfboard or other aerodynamically shaped item will tend to wobble or vibrate up and down, and the free strap ends will also be a distraction.

Some devices have been proposed in the past for attaching elongate items such as skis or surfboards to a vehicle roof or roof rack. In U.S. Pat. No. 5,067,644 of Coleman, for example, a pair of C-shaped, tubular sleeve members are secured around crossbars of a roof rack, and a surfboard is secured on top of the foam sleeves by straps. However, this is still not a particularly stable arrangement, since the foam sleeves may still rotate or move along the crossbar, allowing movement of the board.

SUMMARY OF THE INVENTION

It is an object of the present invention to provide a new and improved support pad assembly for supporting elongate objects such as skis or surfboards on a vehicle roof.

According to one aspect of the present invention, a support pad assembly is provided which comprises first and second elongate members, each elongate member having an upper pad member of cushioning material, the upper member having opposite side edges, a first side bolster hinged to one side edge of the upper member and a second side bolster hinged to the opposite side edge of the upper member, each side bolster being of cushioning material and extending along the entire length of the elongate member, the side bolsters being of rectangular cross-section and having opposing inner faces having interengageable fasteners for releasably securing the side bolsters together beneath the upper pad member, whereby the upper pad member may be located on top of a roof rack crossbar and the lower side bolsters may engage beneath the crossbar to secure the pad assembly over the crossbar, and at least one tie down strap secured to one end of each elongate member for securing an elongate item on top of the upper pad member.

The first and second elongate members will be secured lengthwise to two spaced crossbars of a vehicle roof rack, with the side bolsters acting both to secure the members to the crossbars and to resist vibration or wobbling. An elongate item to be carried, such as a surfboard or the like, is placed transversely over the two upper pad members, and tied down with the tie down strap.

Preferably, the two side bolsters each have a height substantially equal to the height of the crossbars of the roof rack above the vehicle roof, so that they will engage the roof of the vehicle to resist movement of the support devices when the vehicle is driven at speed. The interengageable fasteners preferably comprise a first strip of hook-type fastener material extending along the inner face of one side bolster and a second strip of mating, loop-type fastener material extending along the inner face of the other side bolster. The hook- and loop-type fastener material may be Velcro® or similar material.

A first tie down strap may be secured at one end to a first end of the elongate member, and a second tie down strap may be secured at one end to a second, opposite end of the elongate member, and the two tie down straps also have mating fastener devices for securing them around an item to be supported. The fastener devices on the tie down straps may also comprise mating strips of hook-and-loop type fastener material such as Velcro®.

In an alternative embodiment of the invention, a pair of elongate pad members are designed to be mounted directly on a vehicle roof rather than attached to an existing roof rack, in situations where a vehicle has no roof rack. Each pad member is of rectangular cross-section and has a central core of foam or other cushioning material and an outer cover layer of material. A plate of magnetic material is mounted between a lower surface of the foam core and the cover layer. The magnetic plate will be magnetically secured to a vehicle roof when placed against the roof and will adapt to the shape of the roof. One or more fastener straps are secured to the upper face of each pad member for fastening around an elongate member such as a surfboard supported over the pad members.

In either of the above embodiments, a series of spaced fastener sleeves may be secured across the upper face of the elongate member for fastening around individual skis supported on the pad member. The cushioning or foam material of the pad members will cushion the supported item against damage while being transported, and will also help to reduce vibration and movement of the item when the vehicle is travelling at speed.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENTS

Figure 1:
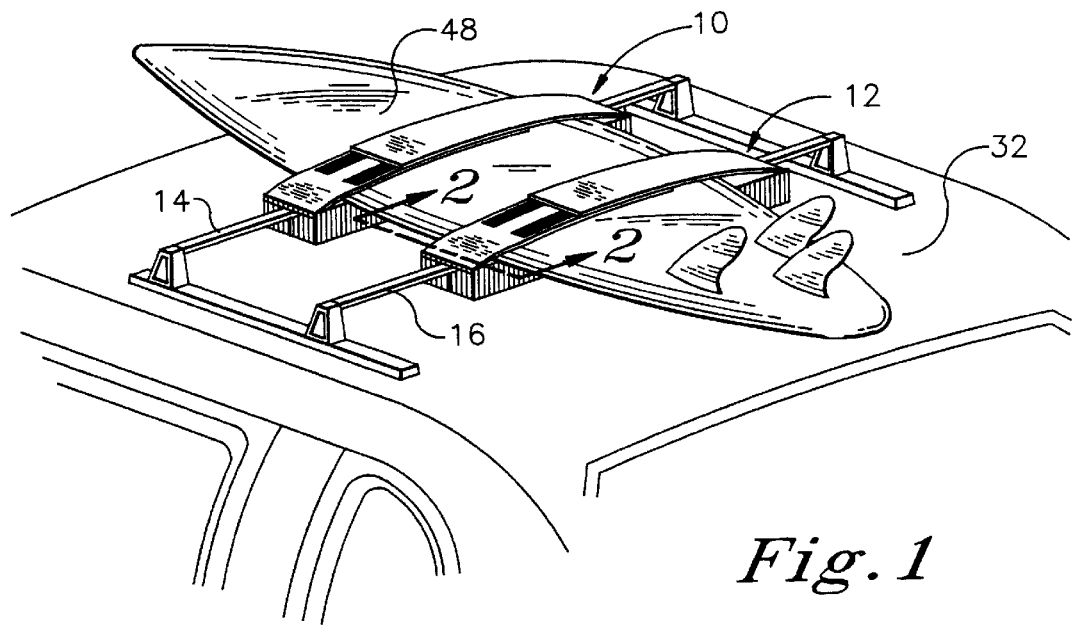
FIG. 1 is a perspective view of a support pad assembly according to a first embodiment of the invention attached to a vehicle roof rack and supporting an item to be transported.
Figure 2:
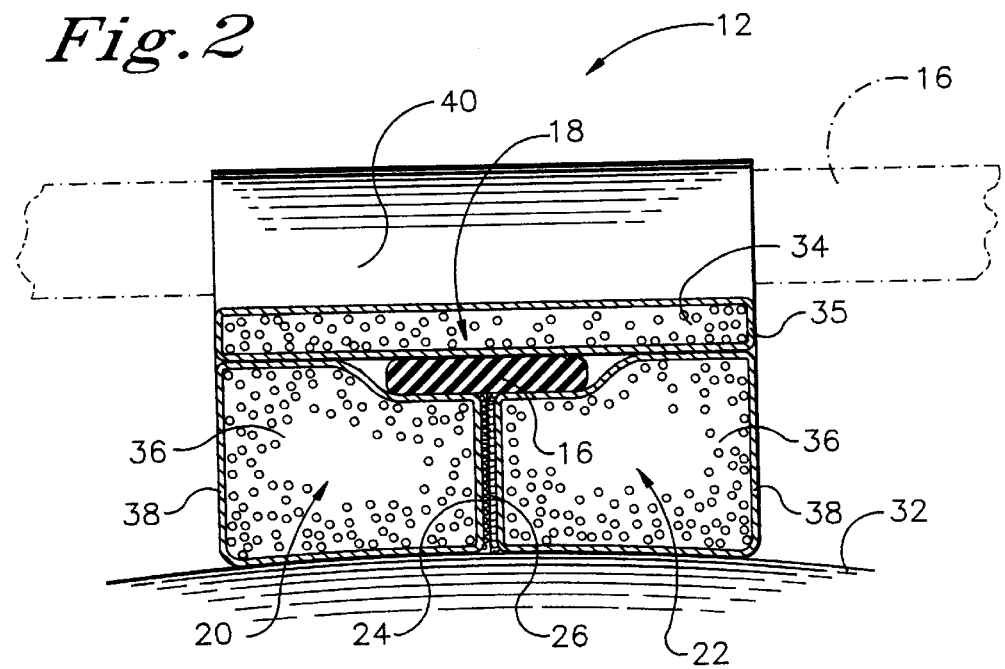
FIG. 2 is a section on the lines 2—2 of FIG. 1.
Figure 3:
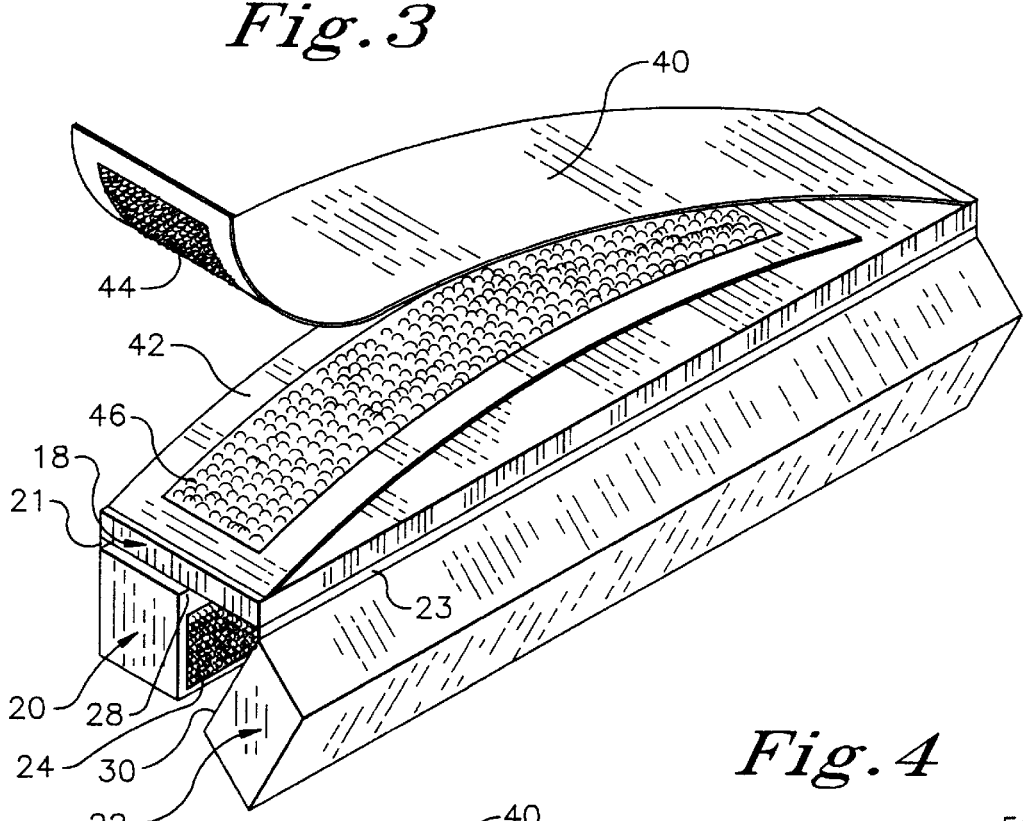
FIG. 3 is a perspective view of one of the pad members of the assembly when released from the roof rack.
Figure 4:
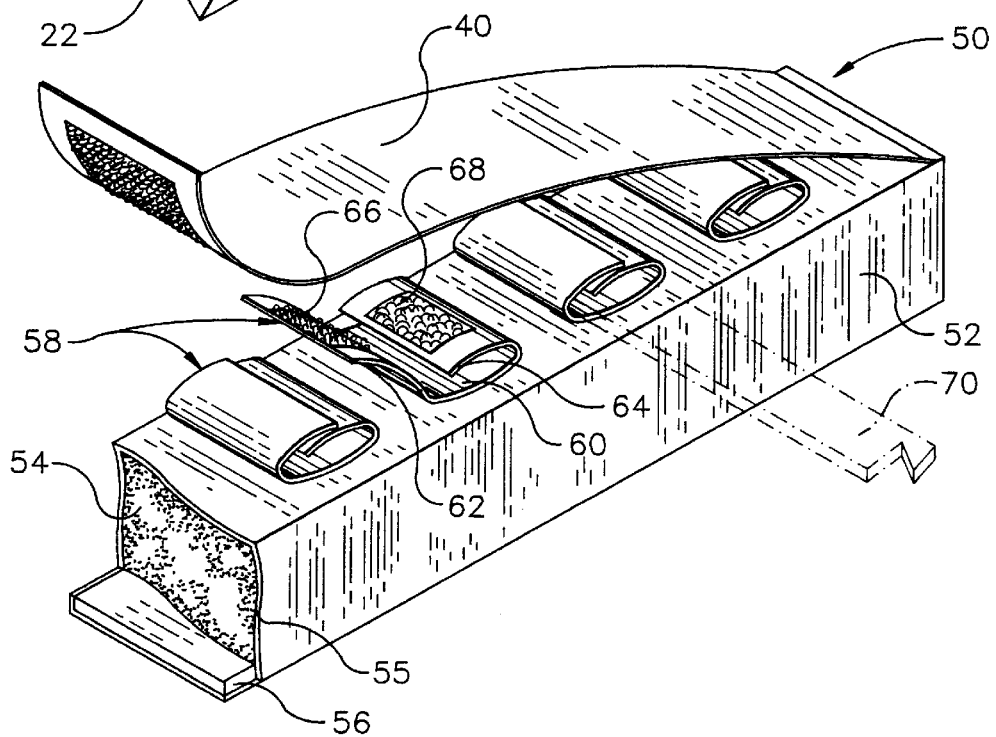
FIG. 4 is a perspective view, partially broken away, of a modified pad member according to a second embodiment of the invention.

FIGS. 1–3 of the drawings illustrate a support pad assembly for a vehicle roof rack according to a first embodiment of the invention, while FIG. 4 illustrates a modified pad for use with vehicles without roof racks. The support pad assembly of FIGS. 1–3 basically comprises a pair of elongate members 10,12 designed for attachment to spaced crossbars 14,16 of a vehicle roof rack. The elongate members 10,12 are identical in construction and like reference numerals will be used for like parts. Each elongate member has an upper pad member 18 for resting on top of the respective crossbar 14,16, and a pair of side bolsters 20,22 of rectangular cross-section hinged to the opposite side edges of the pad member 18. The side bolsters have interengageable fasteners such as opposing strips 24,26 of hook- and loop-type fastener material such as Velcro® secured to their opposing inner faces 28,30, so that they may be secured together beneath the respective crossbar 14,16 to secure the elongate member in position, in a clamshell-like manner, as best illustrated in FIG. 2. The dimensions of the side bolsters are preferably arranged such that, when secured around the crossbar as in FIGS.1 and 2, they will be sandwiched firmly between the crossbar and the vehicle roof 32, with the lower flat faces of the side bolsters engaging the roof, so that the elongate members are securely fastened on the vehicle roof and will resist movement.

The upper pad member 18 has a central core 34 of a suitable cushioning material such as foam rubber enclosed within an outer cover 35 of a suitable material such as Neoprene® or the like. Similarly, each side bolster has a central core 36 of cushioning material such as foam rubber and an outer cover 38. The covers 35 and 38 may be of any suitable material such as Neoprene®, nylon, or the like. Each side bolster is secured along its upper, outer corner to the respective side edge of the upper pad member by means of a line of stitching or the like. A narrow strip 21,23 of material may be stitched along one edge to the respective side edge of the upper pad member and stitched along the lower edge to the outer corner of the respective side bolster, as illustrated in FIG. 3, to provide the hinge connection. This also allows more space for gripping the roof rack crossbar between the upper pad member and side bolsters.

A first fastener strap 40 is secured at one end to a first end of the upper pad member 18 while a second fastener strap 42 is secured at one end to a second end of pad member 18. The first strap 40 has an elongate strip 44 of hook-type fastener material secured to its lower surface, while the second strap 42 has an elongate strip 46 of mating, loop-type fastener material secured to its upper surface for releasably securing the second strap to the first strap to form a loop for engaging around an item to be fastened to the roof rack, such as a surfboard 48 as illustrated in FIG. 1. Preferably, the straps 40,42 are each of elastic material such as Neoprene® or the like, which enables them to be stretched around an item to be secured and to grip the item more firmly. Rather than a single strip of hook- or loop-type fastener material as in FIG. 3, two or more parallel strips 44,46 may be provided as indicated in FIG. 1. The fastener material is preferably Velcro®. Instead of two separate straps 40,42 as illustrated, a single strap may be secured at one end and a loop may be secured at the opposite end of member 18. The free end of the strap may then be threaded through the loop and bent back to secure to the underlying strap portion by suitable strips of hook and loop fastener material, enclosing an item to be secured.

The pad assembly is particularly useful for securing elongate items such as surfboards, windsurfer boards and masts, skis or the like to a roof rack. FIG. 1 illustrates the use of the assembly for securing a surfboard 48 to the roof rack. First, the two elongate members 10,12 are secured around spaced crossbars 14,16 of the roof rack, as best illustrated in FIG. 2, with the side bolsters 20,22 engaging beneath the respective crossbar and secured together so that the elongate member is held firmly in position in a manner which resists any movement relative to the crossbar. The elongate item, such as surfboard 48, is then laid on top of the two upper pad members 18 so as to extend transversely across the roof rack, as illustrated in FIG. 1. The straps 40,42 of the respective elongate members are then tightened over the top of the surfboard 48 to secure it in position. With this arrangement, the surfboard is held firmly in position on a cushioning pad, reducing the risk of scratching, and the elongate members are also held firmly in position due to the sandwiching of the bolsters between the vehicle roof and the roof rack crossbars, resisting vibration or wobbling. There will also be no loose strap ends flapping as the vehicle moves. The tendency of the surfboard to lift up away from the vehicle will be resisted by the firm gripping of the surfboard on the upper pad member and the firm and stable attachment of the upper pad member to the roof rack.

In a modified embodiment, the pad assembly may be made by first cutting a rectangular piece of foamed plastic material, such as polyurethane foam, to form the upper pad member and side bolsters. A central cut is first made from a lower surface of the rectangular piece towards the upper surface, but terminating short of the upper surface. Two side cuts are then made extending from the central cut out towards the opposite sides for a sufficient distance to enable the device to engage around a roof rack cross bar, as in FIG. 2. Alternatively, polyurethane foam may be injection molded to form the upper pad member and side bolsters in one piece. In each case, a narrow strip of the foam material at each side will form the hinge connection between the outer side edges of the upper pad member and the respective side bolsters.

A strip of material such as canvas, burlap or the like is then laid over the inner surface of the upper pad member such that it extends out from opposite ends of the pad member for a sufficient distance to form the fastener straps, and is wrapped around both the upper pad member and side bolsters to form a cover layer for the entire structure in addition to forming the fastener straps. The material may be suitably attached to the pads by adhesive or the like. The entire structure is then dipped in molten plastic material such as poly vinyl chloride or the like to form a vinyl coating layer over both the pad and bolster members and the straps. This allows the assembly to be made in any desired color and with an attractive, shiny and durable finish. The Velcro strips are then attached by glue or the like in the same positions as illustrated in FIGS. 2 and 3. This method of making the assembly has the advantage of being much simpler and less expensive than the stitching technique described above, and results in a stronger assembly, particularly at the hinges, which will be wider than the stitching of the previous embodiment and will be of stronger, foamed plastic material.

FIG. 4 illustrates a modified elongate member 50 for use on a vehicle roof having no roof rack. The member 50 basically comprises an elongate bolster member 52 having a central foam core 54 and an outer covering 55 of a suitable material such as Neoprene®. First and second tie down straps 40,42, which are identical to the straps of the first embodiment, and only one of which is visible in FIG. 4, are secured to the opposite ends of bolster member 52. Additionally, a flat plate 56 of magnetic material is sandwiched between the lower face of core 54 and the outer cover layer, and extends the full length of bolster member 52. The magnetic material is magnetic rubber or the like and can be applied by magnetic adhesion to the metallic roof of a motor vehicle, in a similar manner to a refrigerator magnet. A pair of elongate members 50 will be adhered to a vehicle roof in similar positions to the members 10,12 of the first embodiment, and an elongate item such as a surfboard can be secured to the members 50 using straps 40,42 exactly as described above in connection with the first embodiment. In an alternative arrangement, magnet 56 may be replaced with a plurality of separate, rigid magnets or a flexible magnet plate.

Additionally, a series of releasable fastener sleeves 58 are secured at spaced intervals to the upper surface of the bolster member 52. These may be used for securing narrower items such as skis or the like. Each sleeve 58 comprises a length of a suitable strap material such as Neoprene®, nylon, or the like which is secured to the upper surface of bolster member 52 at a central portion 60 by two or more parallel rows of stitching, leaving two free ends 62,64. One free end 62 has a first strip 66 of hook-type fastener material secured on its inner face, while the opposite free end 64 has a mating strip 68 of loop-type fastener material secured to its outer face, so that the free ends may be wrapped around a ski 70 as indicated in dotted outline in FIG. 4, and secured together using the opposing strips of hook and loop fastener material, which is preferably Velcro®. Fastener sleeves 58 for attaching skis may also be provided on the upper panel member 18 of the first embodiment in an equivalent manner.

When the ski retaining sleeves 58 are provided on either the elongate members 10,12 of the first embodiment or the bolster member 52 of the second embodiment, four or more individual skis may be held securely on a vehicle roof or roof rack. Each ski is placed into aligned sleeves 58 on the spaced elongate members or bolster members, and the free ends 62,64 of the sleeves are tightened and fastened over the respective skis. The straps 40 and 42 are then secured over all of the skis. The skis will then be firmly secured to the vehicle roof in a manner which resists movement or vibration, and also protects both the skis and the vehicle roof against damage.

In each of the above embodiments, a flat lower face of an elongate pad device is secured firmly against the vehicle roof, reducing the risk of wobbling or vibration. At the same time, an elongate object to be carried is secured over an upper face of the pad device which is also flat for additional stability.

The support assembly of this invention is significantly easier to mount and use than prior art devices, and also reduces movement and vibration of elongate objects secured on the support assembly when a vehicle is moving at speed. At the same time, the supported item is cushioned against damage which could otherwise occur if it is mounted directly on a rigid roof rack, for example. The risk of the item becoming loose and possibly falling off the roof is significantly reduced with this arrangement.

Although some preferred embodiments of the invention have been described above by way of example only, it will be understood by those skilled in the field that modifications may be made to the disclosed embodiments without departing from the scope of the invention, which is defined by the appended claims.

I claim:

1. A support assembly for securing an elongate object on a vehicle roof rack, comprising:

a pair of elongate members for securing to spaced crossbars of a vehicle roof rack, each elongate member comprising an upper elongate pad member for resting on top of a roof rack crossbar, the upper pad having opposite first and second side edges, a first elongate bolster member hinged along the first side edge of the upper pad and a second elongate bolster member hinged along the second side edge of the upper pad;

the first and second bolster members having opposing inner faces, one of said inner faces having a first fastener device and the other inner face having a second fastener device for releasable mating engagement with the first fastener device to secure the bolster members together beneath a roof rack crossbar, whereby the elongate member is secured over the crossbar;

the upper pad and bolster members each having a core of cushioning material; and at least one fastener strap secured to the upper pad member for fastening around an elongate object placed across the upper pad member.

2. The assembly as claimed in claim 1, wherein the bolster members are each of rectangular cross-section.

3. The assembly as claimed in claim 2, wherein each bolster member is of predetermined height substantially equal to the spacing between a roof rack crossbar and the underlying vehicle roof, whereby the bolster members are a close fit between the crossbar and roof when the elongate member is secured to the crossbar.

4. The assembly as claimed in claim 1, wherein the first fastener device comprises a strip of loop-type fastener material and the second fastener device comprises a strip of mating hook-type fastener material for releasable mating engagement with the loop-type fastener material.

5. The assembly as claimed in claim 4, wherein each strip extends along the entire length of the respective bolster member.

6. The assembly as claimed in claim 1, wherein the upper pad and bolster members each have an outer cover layer of material covering the core.

7. The assembly as claimed in claim 6, wherein core of each of said members is of foam material.

8. The assembly as claimed in claim 6, wherein the cover layer is of stretchable material.

9. The assembly as claimed in claim 1, wherein the upper pad and bolster members are formed integrally from plastic foam material.

10. The assembly as claimed in claim 1, wherein there are two fastener straps, comprising a first strap extending from one end of said pad member and a second strap extending from the opposite end of said pad member, the straps having interengageable fastener devices for releasably securing the first strap to the second strap to form a loop for enclosing an item laid over said pad member.

11. The assembly as claimed in claim 10, wherein each strap has an outer face and an inner face, the fastener devices comprising at least one strip of hook-type fastener material secured to one face of one of the straps and at least one strip of loop-type fastener material secured to the opposite face of the other strap, whereby one strap may be wrapped over the other strap with the fastener material strips facing one another to secure the straps together.

12. The assembly as claimed in claim 10, wherein each strap is of stretchable material.

13. The assembly as claimed in claim 10, wherein each strap is of resilient material.

14. The assembly as claimed in claim 1, wherein the upper pad member has an upper face, and further comprising a plurality of spaced fastener sleeves secured to the upper face of the pad member, each fastener sleeve having opposite free ends each having an outer face and an inner face, the inner face of one free end having a first fastener device and the outer face of the other free end having a second fastener device for releasable mating engagement to the first fastener device to secure a narrower object to the elongate member.

15. The assembly as claimed in claim 14, wherein the fastener devices of said fastener sleeves comprise mating strips of hook- and loop-type fastener material.

16. The assembly as claimed in claim 1, wherein each bolster member is of rectangular cross-section and a width equal to approximately half the width of the upper pad member, each bolster member having an upper, outer corner, and a hinge attachment extending along the upper outer corner of each bolster member between the bolster member and adjacent side edge of the upper pad member.

17. A support pad assembly for supporting an elongate object on a vehicle roof, comprising:

a pair of elongate pad members of rectangular cross-section;

each pad member having a securing device for securing the pad member on a vehicle roof to extend transversely across the width of the roof;

each pad member having a flat lower face for resting against the vehicle roof when the pad member is secured on the roof, a flat upper face for supporting at least one elongate extending transversely across the pad member, and a core of cushioning material;

at least one fastener strap secured to each pad member for securing around an object resting over the upper face of the pad member; and each pad member comprising an upper pad for resting on top of a roof rack crossbar and a pair of side bolster pads hinged to opposite side edges of the upper pad, the side pads having mateable fastener devices for releasably securing the side pads together beneath the roof rack crossbar to secure the pad member to the crossbar, the side pads comprising said securing device.

18. The assembly as claimed in claim 17, including a plurality of fastener sleeves secured at spaced intervals across said flat upper face, each fastener sleeve comprising means for securing around a narrow elongate item, whereby a plurality of elongate items may be secured on said elongate pad members.

* * * * *

UNITED STATES PATENT AND TRADEMARK OFFICE
CERTIFICATE OF CORRECTION

PATENT NO. : 5,769,291
DATED : June 23, 1998
INVENTOR(S) : Paul E. Chasan

It is certified that error appears in the above-indentified patent and that said Letters Patent is hereby corrected as shown below:

Column 7, line 15, after "elongate" insert --object--

Signed and Sealed this

Twenty-seventh Day of March, 2001

Attest:

NICHOLAS P. GODICI

Attesting Officer     Acting Director of the United States Patent and Trademark Office